Jan. 20, 1931.                W. T. GUTH                1,789,930
                            MASHING UTENSIL
                         Filed March 26, 1930

INVENTOR
William T. Guth.
BY Moses & Nolte
ATTORNEYS

Patented Jan. 20, 1931

1,789,930

UNITED STATES PATENT OFFICE

WILLIAM T. GUTH, OF BROOKLYN, NEW YORK

MASHING UTENSIL

Application filed March 26, 1930. Serial No. 439,003.

The present invention relates to a mashing and mincing fork, the invention being more particularly directed to the handle for the fork. It will be understood however, that the principles of the invention may be applied to other tools.

The utensil illustrated as one embodiment of my invention is used for mashing and mincing food stuffs, such as boiled vegetables and eggs, raw tomatoes, fruits, etc. This operation includes a rocking action and is accompanied by a slight pushing forward and drawing back motion. In order to effectually perform this operation the operator must have complete control of the utensil and at the same time subject it to substantial pressure.

The present invention is, therefore, directed to the handle of the utensil which assists in the operation. For this purpose the handle is provided with a portion to be gripped by the right hand of the operator with which the rocking and sliding movements are controlled, and with another portion which is gripped by the left hand of the operator for exerting the desired pressure. Other objects of the invention are to provide the utensil with a handle of the type described which is capable of being gripped by the operator's hands in the manner described and illustrated and which provides proper and secure support for the hand and more particularly for the thumb of the right hand which enters largely in the proper control of the rocking and sliding movements.

The invention will be more clearly understood from the following description and the accompanying drawings.

The present invention is directed to a mashing and mincing fork comprising the fork 6 and the handle 7, the two being so arranged that in normal use the handle makes an angle of approximately 45°, with the horizontal.

Figure 1:
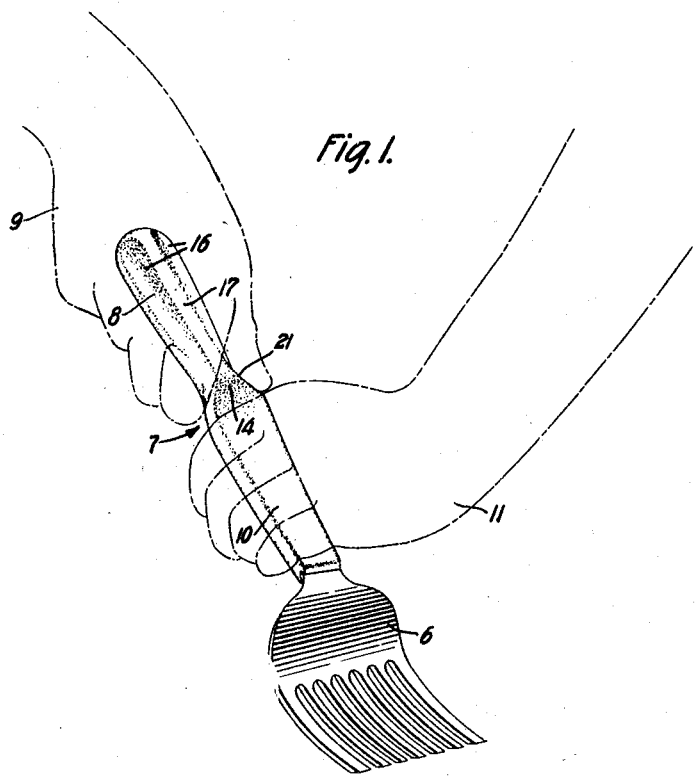
Fig. 1 is a perspective view of the utensil
40 showing the same being gripped by the hands of the operator.
Figure 2:
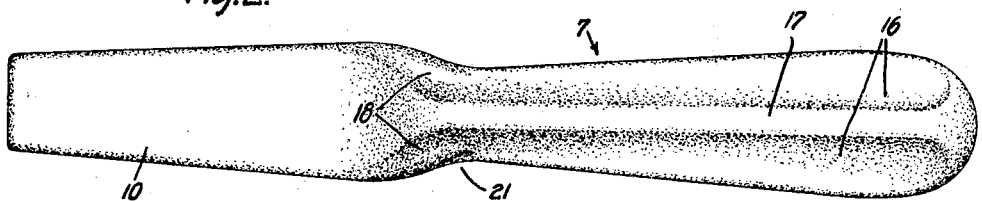
Fig. 2 is a plan view of the handle.
Figure 3:
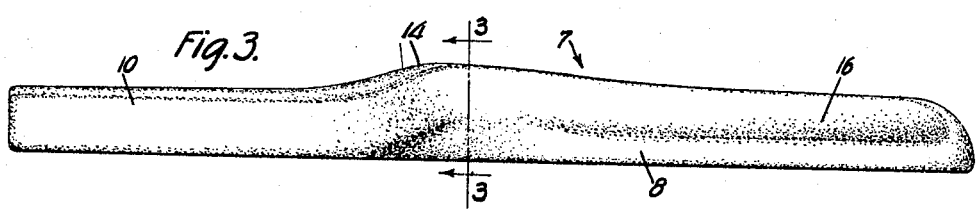
Fig. 3 is a side view of the handle.

The manner in which the present utensil is used and its ready adaptability to the hand is shown in Fig. 1. The tined mashing and mincing member is shown at 6 and the handle at 7. The handle has a portion 8 adapted to be gripped by the right hand 9 of the operator as shown in dotted lines; and a portion 10 adapted to be gripped by the left hand 11 of the operator.

Figures 4, 5:
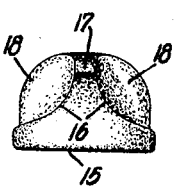
Fig. 4 is an end view.
Fig. 5 is a sectional view on line 3—3 of Fig. 3.

The portion 8 is longer than the portion 10 and tapers toward the section 10 thereby forming the neck or constriction 21. The portion 8 is shaped as shown in Fig. 4 so that it fits snugly into the hand 9, and is symmetrical along its major portion. At the constriction 21, however, the side 12 is given a smaller curvature and its surface is substantially flat in order to provide firm support for the thumb of the right hand. The side 12 of the constricted portion 21, therefore, serves to permit wide contact for the thumb, this contact being longitudinally concave and substantially flat transversely. The side 13 of the constricted portion is rounded so as to eleminate any sharp corners from digging into the forefinger as it rounds the constriction to cooperate with the thumb for the handling and control of the utensil.

The portion 10 of the handle is provided with a flat surface on its top so as to give firm support for the left hand to exert the necessary downward pressure. While the section of the portion 10 is substantially rectangular it has rounded corners and the two sides thereof are inclined towards each other as they approach the fork 6. The under faces of the portions 8 and 10 are flat and continuous and the portion 10 is largely thinner than part 8 and is therefore provided with an enlarged portion 14 which serves as a border for its flat surface and provides for a less abrupt change in level in the upper surface of the handle.

While the cross sectional shape of the part 8 may be varied as desired, it is shown as having a substantially flat wide bottom 15 and is formed with concave sides 16 which form the longitudinal ridge 17. The concave faces 16 flow into the constriction 21 and into the faces 12 and 13, while the upper face of the ridge 17 slopes downwardly and backwardly. The portions 18 serve as knuckles against which the thumb and forefinger of the right hand lean, while the other three fingers press against the flat of the back. It will be apparent that these structural features cooperate to provide a comfortable and firm grip for the right hand and facilitate the directive control of the utensil for the rocking and sliding movements desired.

While as shown in Fig. 1 the left hand grips the portion 10, it will be understood that depending upon the nature of the material treated, the left hand may press upon the flat surface of the part 10 with the fingers or with the palm of the hand as desired.

By means of the present invention a handle is provided whereby the operator may bring both hands into operation and into proper cooperation with great comfort, and to properly control the downward pressure as well as the rocking and sliding movement.

I claim:

A mashing and mincing fork, in combination with a handle therefor, said handle having a substantially flat portion at the end adjacent the fork for application of pressure by one hand and a second portion at the other end to be gripped by the other hand, said second portion having a substantially triangular cross-section and tapered towards and merging into said first portion, and a pair of knuckles between said portions for the support of the thumb and forefinger of the other hand, said portions being constructed and arranged to permit the operator to impart to the fork a rocking action and the application of a substantial pressure to the same.

In testimony whereof I have affixed my signature to this specification.

WILLIAM T. GUTH.